United States Patent [19]

Wilkins

[11] Patent Number: 6,119,583
[45] Date of Patent: Sep. 19, 2000

[54] COOKING APPLIANCE

[75] Inventor: Peter Ravenscroft Wilkins, Droitwich, United Kingdom

[73] Assignee: Ceramaspeed Limited, United Kingdom

[21] Appl. No.: 09/262,539

[22] Filed: Mar. 4, 1999

[30] Foreign Application Priority Data

Mar. 14, 1998 [GB] United Kingdom .................... 9805420

[51] Int. Cl.[7] .............................. A47J 37/00; A47J 37/01; A47J 37/10; H05B 3/26; H05B 6/12
[52] U.S. Cl. ................................ 99/337; 99/422; 99/450; 219/385; 219/521; 392/418; 392/422
[58] Field of Search ............................ 99/337, 338, 422, 99/426, 450, 451, DIG. 14; 126/214 C, 215, 388, 390, 246, 21 A, 92 AC, 92 R, 41 R; 219/385, 521, 620–624, 451.1, 454.11, 455.12, 467.1; 220/410, 405, 425; 392/418, 422; 206/557

[56] References Cited

U.S. PATENT DOCUMENTS

| | | | |
|---|---|---|---|
| 3,797,375 | 3/1974 | Cerola | 99/422 X |
| 3,987,275 | 10/1976 | Hurko . | |
| 3,987,719 | 10/1976 | Klan | 99/426 X |
| 4,196,083 | 4/1980 | Wolff | 219/385 X |
| 4,607,613 | 8/1986 | Toldi . | |
| 4,865,219 | 9/1989 | Logan . | |
| 4,873,921 | 10/1989 | Piane, Sr. | 99/422 |
| 4,889,103 | 12/1989 | Fraioli | 126/92 R |
| 4,943,705 | 7/1990 | Halloran . | |
| 5,213,027 | 5/1993 | Tsotsos et al. | 99/450 X |
| 5,579,679 | 12/1996 | Hsu | 219/214 X |
| 5,687,642 | 11/1997 | Chao . | |
| 5,782,172 | 7/1998 | Schacht | 99/422 |
| 5,809,630 | 9/1998 | Coissard | 126/390 X |
| 5,850,779 | 12/1998 | Zimmerman | 99/442 X |
| 5,868,063 | 2/1999 | Longmuir | 219/401 X |
| 5,934,179 | 8/1999 | Schmid et al. | 99/337 |
| 5,943,949 | 9/1999 | Sham et al. | 99/450 |

FOREIGN PATENT DOCUMENTS 19600322 7/1997 Germany .

OTHER PUBLICATIONS

Search Report, Jun. 19 1998.
European Search Report, undated.

Primary Examiner—Timothy Simone
Attorney, Agent, or Firm—Ira S. Dorman

[57] ABSTRACT

A cooking appliance includes a trough-shaped container arrangement (2) formed of frangible material and supported and arranged for receiving at least one food item to be thermally processed. At least one electric heater (5) is supported underneath the container arrangement and incorporates at least one heating element (8). At least one apertured member (11) is provided between the at least one heater and the underside of the container arrangement and covers the at least one heater. With this configuration, in the event of breakage of the container arrangement (2) the apertured member (11) remains intact and user contact with the heating element (8) in the heater (5) is prevented.

15 Claims, 1 Drawing Sheet

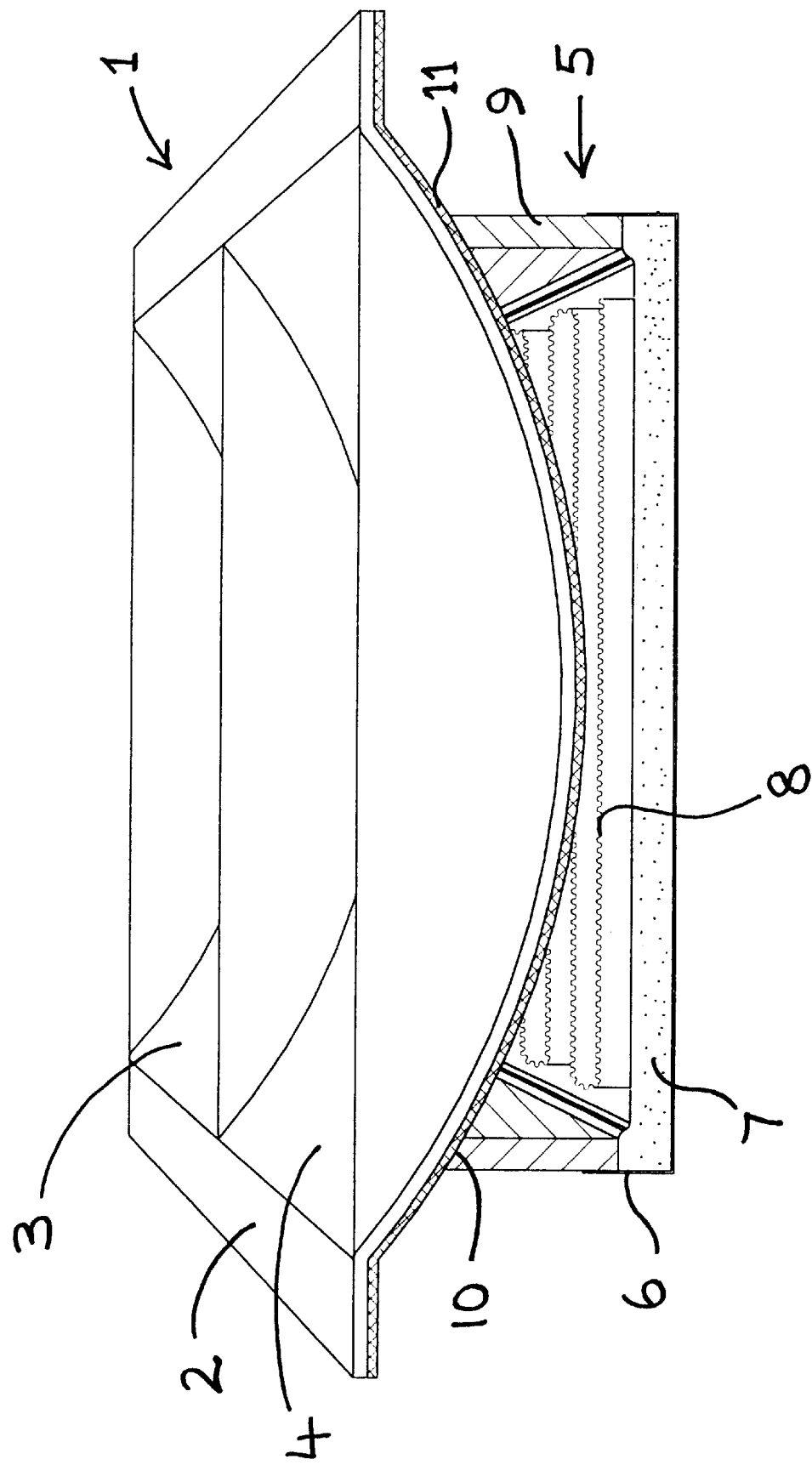

COOKING APPLIANCE

FIELD OF THE INVENTION

This invention relates to a cooking appliance comprising a trough-shaped container arrangement formed of frangible material, such as glass, ceramic, or glass-ceramic, provided with at least one electric heater supported underneath. The container arrangement is supported and arranged for receiving at least one food item to be thermally processed therein, for example for preparation or cooking.

The trough-shaped container arrangement may comprise a plurality of containers arranged in side-by-side array, to permit a series of in-line thermal processing operations to be carried out on one or more food items.

BACKGROUND TO THE INVENTION

A particular problem with such an appliance is that if during use the trough-shaped container arrangement should break, there is a risk of user contact with one or more hot, electrically live heating elements in the underlying one or more electric heaters.

OBJECT OF THE INVENTION

It is an object of the present invention to overcome or minimise this problem.

SUMMARY OF THE INVENTION

According to the present invention there is provided a cooking appliance comprising a trough-shaped container arrangement formed of frangible material and supported and arranged for receiving at least one food item to be thermally processed; at least one electric heater supported underneath the container arrangement and incorporating at least one heating element; and at least one apertured member provided between the at least one heater and the underside of the container arrangement and covering the at least one heater, whereby in the event of breakage of the container arrangement the apertured member remains intact and user contact with a heating element in the heater is prevented.

The at least one apertured member may be provided with apertures dimensioned such that a standard finger conforming to European Standard EN60-335 is unable to pass therethrough to contact the heating element in the heater.

The at least one apertured member may comprise a metal or a ceramic and when of a metal, may be electrically grounded or earthed. The at least one apertured member may comprise a metal mesh, such as of expanded metal form, or a perforated metal or ceramic sheet.

The at least one apertured member may have a profile substantially corresponding to that of the underside of the container arrangement.

The at least one heater may be provided with an upstanding peripheral wall, with the at least one apertured member overlying the peripheral wall. The apertured member overlying the peripheral wall may contact the underside of the container arrangement and the peripheral wall may have an upper surface profiled to substantially conform to the profile of the underside of the container arrangement.

The container arrangement may comprise glass, ceramic, or glass-ceramic.

The trough-shaped container arrangement may comprise a plurality of containers arranged in side-by-side array, to permit a series of in-line thermal processing operations to be carried out on the at least one food item. The plurality of containers may be formed individually and assembled to form the container arrangement or may be formed as an integral unit constituting the container arrangement.

A plurality of electric heaters may be provided.

BRIEF DESCRIPTION OF THE DRAWING

The invention is now described by way of example with reference to the accompanying drawing which is a sectional view of a cooking appliance according to the invention.

DESCRIPTION OF PREFERRED EMBODIMENT

A cooking appliance 1 comprises a trough-shaped container arrangement 2, formed of a frangible material, such as glass, ceramic or glass-ceramic and more particularly the latter. The arrangement suitably comprises a plurality of containers 3, 4 arranged in side-by-side array. The containers 3, 4 may be formed individually and assembled together to form the container arrangement or may be formed as an integral unit constituting the container arrangement.

The container arrangement is supported with the containers 3, 4 arranged for receiving at least one food item to be thermally processed therein such as for preparation or cooking. A series of in-line thermal processing operations is able to be carried out on the one or more food items by treating in one container 3 and then transferring into the next container 4, and so on.

The container arrangement is heated by means of one or more electric heaters 5 supported underneath it. A single heater may be provided extending substantially along the entire length of the container arrangement, or two or more such heaters may be arranged side by side with each extending substantially along the entire length of the container arrangement.

Alternatively, a plurality of heaters may be provided and arranged such that one or more separate heaters is or are provided under each container 3, 4 of the arrangement.

The or each heater 5 comprises a metal support tray or dish 6 containing a base layer 7 of thermal and electrical insulation material, which is preferably microporous thermal insulation material of well known form. At least one electrical heating element 8 is provided on or adjacent to the base layer 7 and comprises any of the well known forms, such as wire, ribbon or lamp forms. The at least one electrical heating element 8 may particularly comprise a corrugated ribbon supported edgewise on the base layer 7 and secured by partial embedding therein.

A peripheral wall 9 of thermal insulation material is provided in the or each heater 5. The peripheral wall 9 has an upper surface 10 profiled to conform substantially to the profile of the underside of the container arrangement.

A well-known form of thermal limiter (not shown) is provided on the or each heater 5.

If the or each heater 5 were to be supported with the upper surface 10 of the peripheral wall in contact with the underside of the container arrangement 2 and energised for carrying out a thermal processing operation on one or more food items located in the container 3 or 4 of the arrangement, then if accidental breakage of the container arrangement 2 were to occur, the hot and electrically live heating element or elements 8 would become exposed and liable to be contacted by a user of the appliance. In order to avoid this, while maintaining operating efficiency of the heater, at least one apertured member 11 is provided between the or each heater 5 and the underside of the container arrangement 2 and is constructed so as to remain intact in the event of breakage of the container arrangement and to prevent contact by a user with the heating element or elements 8. The apertured member 11 is arranged to cover its associated heater 5, in contact with the upper surface 10 of the peripheral wall 9 and the underside of the container arrangement 2 and is preferably arranged to have a profile substantially corresponding to that of the underside of the container arrangement 2. Such apertured member is preferably provided with apertures dimensioned such that a standard finger conforming to European Standard EN60-335 is unable to pass through the apertures therein to contact the heating element or elements 8. The apertured member 11 suitably comprises a metal, such as a stainless steel, and may be in the form of a metal mesh, such as of expanded metal form, or a perforated metal sheet. It could however comprise another suitably refractory material, such as in the form of a perforated ceramic sheet, provided the material thereof is sufficiently strong for the member to remain intact in event of breakage of the container arrangement 2 and is able to be profiled to match the underside of the container arrangement, if required.

When the apertured member comprises a metal, it is preferably electrically connected to ground or earth in the interests of electrical safety.

As shown in the accompanying drawing, the apertured member 11 is provided covering substantially the entire underside of the container arrangement 2. This is not essential. Instead, the apertured member 11 could be provided covering only the upper surface of the heater 5 and secured in contact with the upper surface of the peripheral wall 9.

I claim:

1. A cooking appliance comprising a trough-shaped container arrangement formed of frangible material and supported and arranged for receiving at least one food item to be thermally processed; at least one electric heater supported underneath the container arrangement and incorporating at least one heating element; and at least one apertured member provided between the at least one heater and the underside of the container arrangement and covering the at least one heater, whereby in the event of breakage of the container arrangement the apertured member remains intact and user contact with the heating element in the heater is prevented.

2. A cooking appliance according to claim 1, wherein the at least one apertured member is provided with apertures dimensioned such that a standard finger conforming to European Standard EN60-335 is unable to pass therethrough to contact the heating element in the heater.

3. A cooking appliance according to claim 1, wherein the at least one apertured member is selected from a metal and a ceramic.

4. A cooking appliance according to claim 3, wherein the at least one apertured member is of a metal and is electrically grounded.

5. A cooking appliance according to claim 3, wherein the at least one apertured member is selected from a metal mesh, a perforated metal and ceramic sheet.

6. A cooking appliance according to claim 5, wherein the metal mesh is of expanded metal form.

7. A cooking appliance according to claim 1, wherein the at least one apertured member has a profile substantially corresponding to that of the underside of the container arrangement.

8. A cooking appliance according to claim 1, wherein the at least one heater is provided with an upstanding peripheral wall and the at least one apertured member overlies the peripheral wall.

9. A cooking appliance according to claim 8, wherein the apertured member overlying the peripheral wall contacts the underside of the container arrangement.

10. A cooking appliance according to claim 9, wherein the peripheral wall has an upper surface profiled to conform substantially to the profile of the underside of the container arrangement.

11. A cooking appliance according to claim 1, wherein the container arrangement is selected from glass, ceramic and glass-ceramic.

12. A cooking appliance according to claim 1, wherein the trough-shaped container arrangement comprises a plurality of containers arranged in side-by-side array, to permit a series of in-line thermal processing operations to be carried out on the at least one food item.

13. A cooking appliance according to claim 12, wherein the plurality of containers are formed individually and assembled to form the container arrangement.

14. A cooking appliance according to claim 12, wherein the plurality of containers are formed as an integral unit constituting the container arrangement.

15. A cooking appliance according to claim 1, wherein a plurality of electric heaters are provided.

* * * * *